June 10, 1969     T. M. O'HARA     3,448,637
PLANETARY TRANSMISSION
Filed Jan. 18, 1968     Sheet _1_ of 3
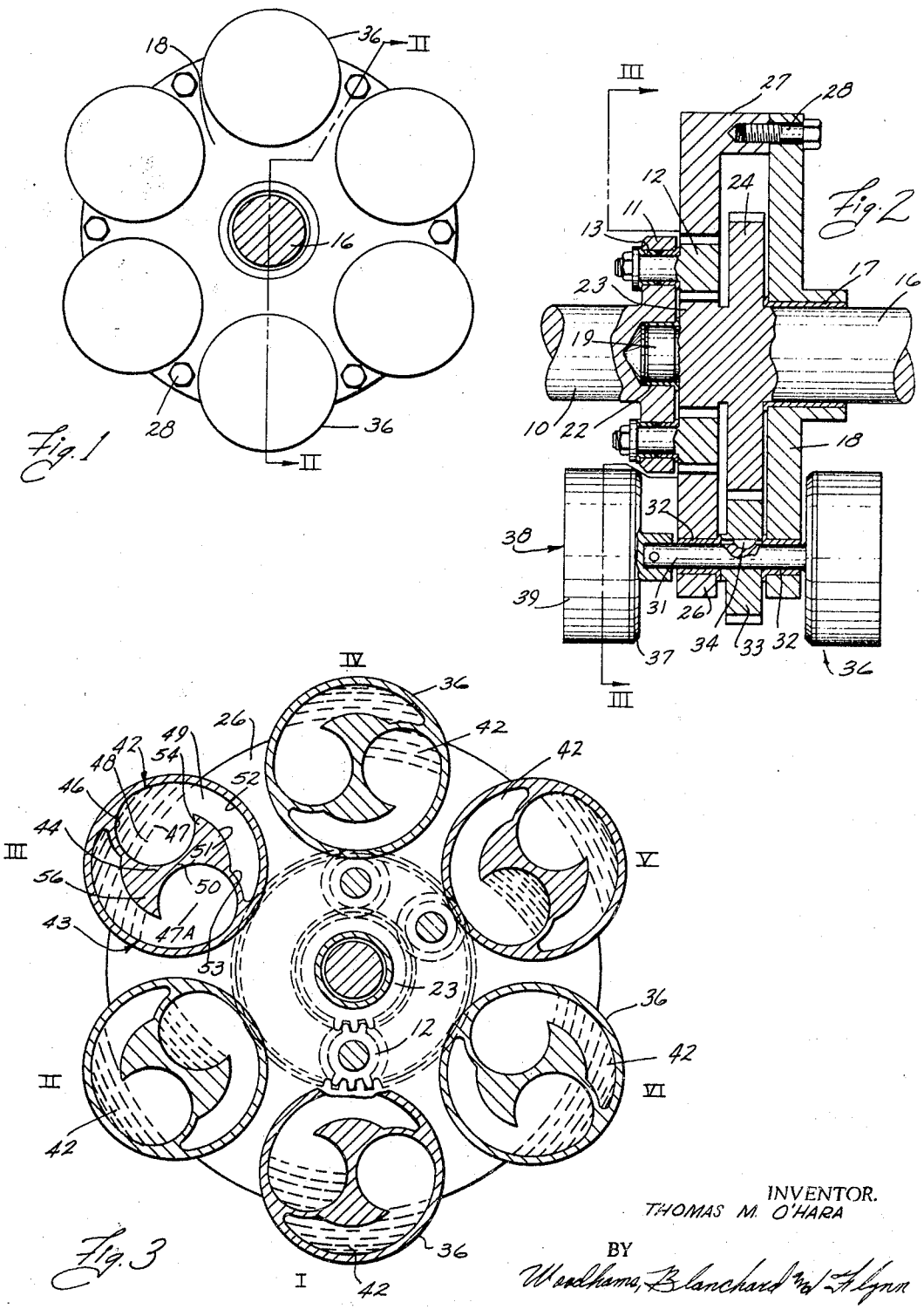
INVENTOR.
THOMAS M. O'HARA
BY
*Wendhams, Blanchard & Flynn*
ATTORNEYS

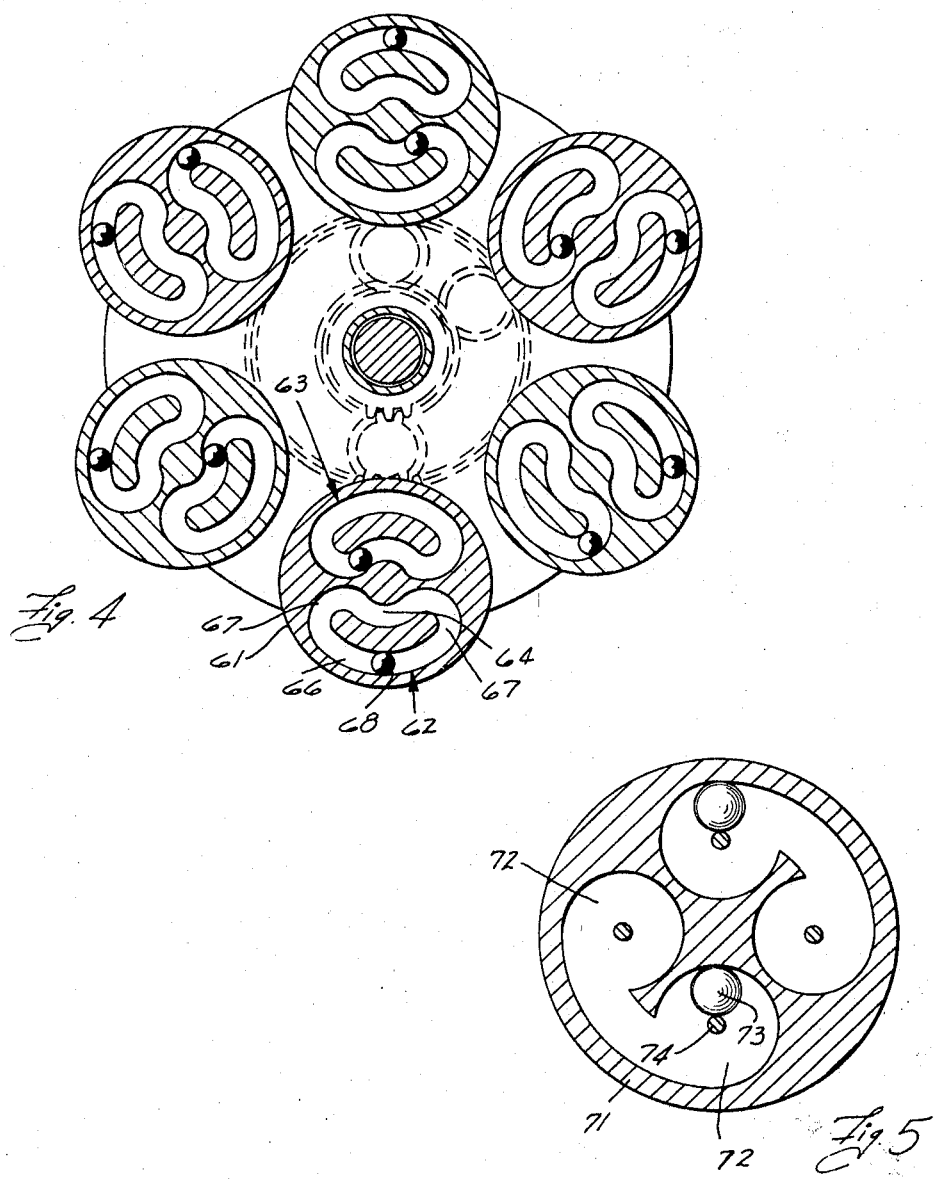

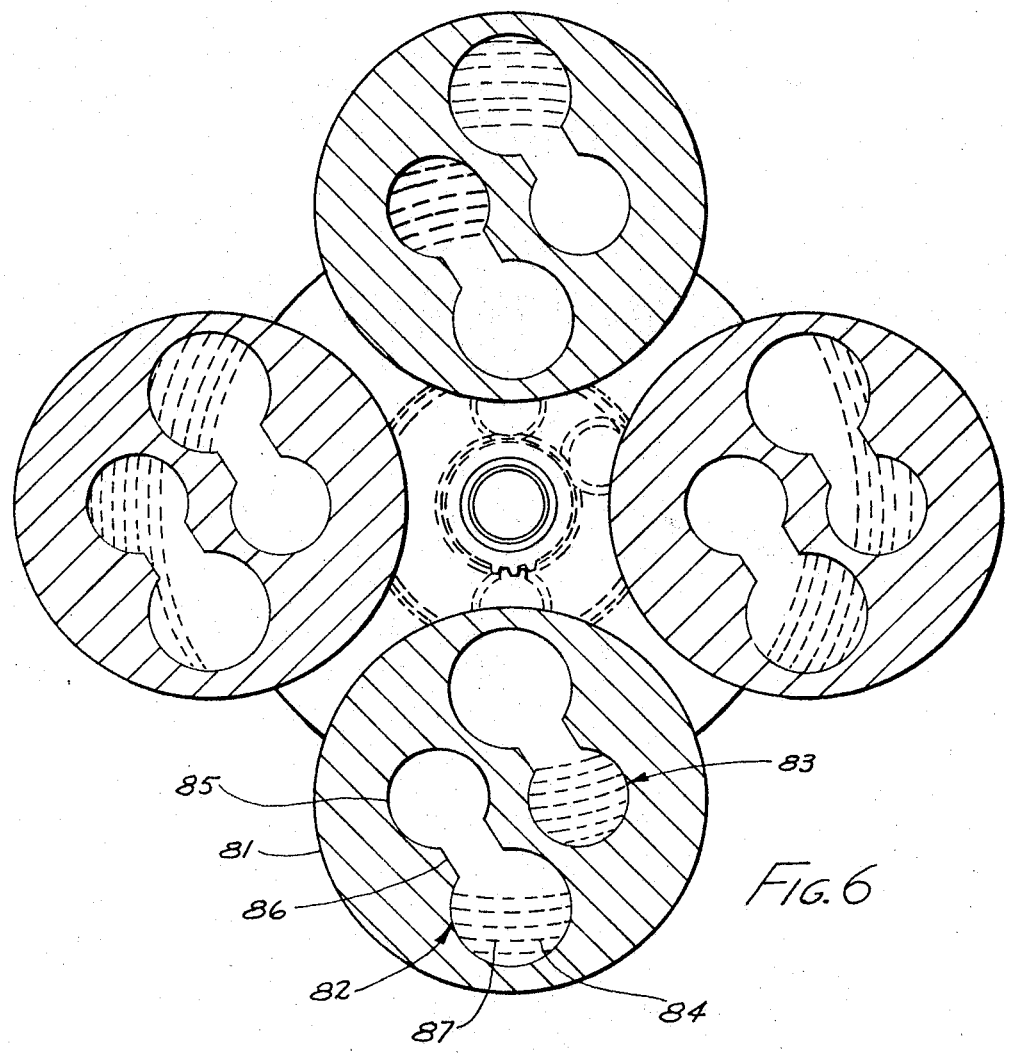

United States Patent Office 3,448,637
Patented June 10, 1969

1

3,448,637
PLANETARY TRANSMISSION
Thomas M. O'Hara, 19932 Asbury Park,
Detroit, Mich. 48235
Continuation-in-part of application Ser. No. 481,269,
Aug. 20, 1965. This application Jan. 18, 1968, Ser.
No. 703,837
Int. Cl. F16h *3/44, 57/10*
U.S. Cl. 74—752    13 Claims

ABSTRACT OF THE DISCLOSURE

A variable speed coupling comprisig a planetary transmission in which the planet gears each have housings connected thereto. The housings each have two symmetrically arranged chambers of special shapes therein and weights are movable therein during rotation of the planet gears to resist rotation of said planet gears in order to transmit torque to the load. A step-up transmission is connected to the input shaft in order to reduce the response time of the coupling.

---

This application is a continuation-in-part of my copending application Ser. No. 481,269, now abandoned, entitled "Planetary Transmission," filed Aug. 20, 1965.

This invention relates to a variable speed coupling or torque converter comprising a plurality of rotatable planetary gears revolving about a sun gear and provided with weights which are responsive to centrifugal force for resisting rotation of said planetary gears about their own axes. This invention is an improvement on the subject matter of my United States Patent No. 2,692,517, dated Oct. 26, 1954.

In my patent above referred to, I have disclosed a variable speed coupling having a plurality of planetary gears for driving a sun gear. A housing containing a liquid mass is associated with each planetary gear. The housing is shaped so as to restrain movement of the liquid so that the liquid resists rotation of its associated planetary gear about its own axis in order that torque can be transmitted from the planetary gear to the sun gear.

While the coupling disclosed in my above-mentioned patent is generally satisfactory, it has been found that it can be improved in order to obtain better operation. One problem with the prior coupling is that its starting torque is relatively low so that the coupling is relatively slow in reaching operating speed. There are many uses for a unit of this type which require a fast response time and my prior coupling has not been fully satisfactory for such purposes. A further problem with my prior coupling is that the liquid is not sufficiently closely controlled which causes it to be somewhat rougher in operation than is desired and also causes rapid wear of the parts.

Accordingly, it is a principal object of this invention to provide a variable speed coupling employing the same advantageous operating features as the coupling disclosed in my above-mentioned patent, but which has improved operating characteristics.

A further object of this invention is to provide an improved variable speed coupling, as aforesaid, in which the flow of the fluid is much more closely controlled and the fluid moves through an arcuate path of greater length so that it flows more smoothly and gradually whereby the coupling operates more smoothly.

It is a further object of this invention to provide an improved variable speed coupling, as aforesaid, which has a greater starting torque.

Other objects and advantages of the invention will become apparent to persons acquainted with equipment

2 of this type upon reading the following description and inspecting the accompanying drawings, in which:

FIGURE 1 is an end view of a variable speed coupling embodying the invention.

FIGURE 2 is a sectional view taken along the line II—II of FIGURE 1.

FIGURE 3 is a schematic view substantially taken along the line III—III of FIGURE 2, and showing the condition of the fluid in six different positions of the housing.

FIGURE 4 is a view similar to FIGURE 3 and showinga modification.

FIGURE 5 is a sectional view of a modified housing.

FIGURE 6 is a view similar to FIGURE 3 and showing a still further modification.

Referring to the drawings, the planetary transmission embodying the invention comprises a driving shaft 10 which has a radially extending flange 11 on which are rotatably mounted a plurality of first planet gears 12, there being two such planet gears 12 in the preferred embodiment of the invention illustrated in the drawings, although different numbers of planet gears can be used. The planet gears 12 are supported by bushings 13 for rotation with respect to the flange 11 about their own axes as they also rotate around the axis of the drawing shaft 10.

A driven shaft 16 is mounted on a carrier 18 and is rotatably supported by a bushing 17 in said carrier. The driven shaft 16 has a pilot 19 received into a counterbore 21 in the end of the driving shaft 10 and said pilot is rotatably supported in said driving shaft by a bushing 22. The shafts 10 and 16 are coaxial and each may be connected to suitable driving and driven means (not shown) in any conventional manner. The driven shaft 16 carries two sun gears 23 and 24, which are disposed in axially spaced-apart relation and are here shown as being integral with said driven shaft. Sun gear 23 is located adjacent the flange 11 and is meshed with the planet gears 12.

A ring gear 26 has an axially extending flange portion 27 secured to the carrier 18 by screws 28. The sun gear 24 is received in the space between said ring gear 26 and said carrier 18. The ring gear 26 surrounds and meshes with the planet gears 12.

A plurality of shafts, here six shafts, one of which is indicated at 31, extend through openings in the carrier 18 and the ring gear 26 and are rotatably supported thereon by bushings 32. Second planet gears 33 are mounted on the shafts 31 and are disposed in the space between the carrier 18 and the ring gear 26 and are in mesh with the sun gear 24. The second planet gears 33 are keyed in any conventional manner, as indicated at 34, to the shafts 31.

A pair of housings 36 are secured to the opposite ends of each of the shafts 31. The housings 36 are identical and have a circular external contour so that said housings are symmetrical about a center coaxial with the shaft 31 on which they are respectively mounted. The housings 36 comprise a mounting wall 37 and a member 38 having a periphera wall 39. The member 38 is secured to the mounting wall 37 and forms therewith an enclosed chamber.

The chamber has two symmetrically arranged sections 42 and 43 of the same size and shape separated by a dividing wall 44. Since the chamber sections 42 and 43 are identical, only sections 42 will be described in detail herein and it will be understood that such description applies also to the section 43. The section 42 has an arcuate wall 46 curved at a constant radius about a center 47 and extending through an arc of about 270 degrees. Thus, the arcuate wall 46 defines a substantially circular cavity 48. It will be noted that the center of symmetry 50, the center 47 and the corresponding center 47A of the chamber section 43 lie in a common diametric plane and that the thickness of the dividing wall 44 cut by this plane is only thick enough to provide adequate mechanical strength, in order to reduce the inertia of the housing. Leading out from the cavity 48 is an elongated arcuate blind-ended passage 49 which is concentric with the central axis 50 of the housing. The passage 49 has radially inner and outer walls 51 and 52 which are curved at a constant radius about an axis of symmetry of the housing. The radially outer wall 52 merges smoothly with and constitutes an extension of the wall 46 at the radially outermost point thereon. The passage has an end wall 53 which is shaped so as to fit closely with the adjacent end of the other chamber section.

The dividing wall 44 provides two substantially cusp-shaped projections 54 and 56 which have the effects described in greater detail hereinbelow. The housings associated with each of the planetary gears 33 are identical and, hence the foregoing description applies equally to each of the other housings.

Within each of the chamber sections 42 and 43 there is a freely movable weight, which preferably is a heavy liquid, such as mercury. The exact quantity of the liquid can be varied somewhat depending upon the particular usage intended but, by way of example, said chamber sections each may contain an amount of fluid sufficient to about half fill the cavity 48.

Rotation of the drive shaft 10, while holding the driven shaft 16 against rotation, will cause the first planet gears 12 to rotate about their own axes, as well as to rotate about the axis of the driving shaft, since said planet gears are meshed with the sun gear 23 which is assumed to be stationary. Such rotation of the planet gears 12 about their own axes will cause rotation of the ring gear 26 and the carrier 18. Since the second planet gears 33 are meshed with the stationary sun gear 24, said planet gears 33 and the shaft 31 and the housings 36 will rotate about the axes of the respective shafts. The planet gears 12, 33 and ring gear 26 will rotate in the same direction which is here assumed to be clockwise.

It will be noted that the cavities 48 are located at the trailing (counterclockwise) ends of the chamber sections. Hence, the centrifugal force acting on the flowable weight in the chamber sections will retard and tend to stop rotation of the planet gears 33 about their own axes and thereby through the sun 24 tend to rotate the driven shaft 16. When the centrifugal force is sufficient to overcome the resistance of the driven shaft 16, the driven shaft will start to rotate. The rate of rotation of the planet gears 12 and 33 and of the ring gear 26 will decrease. When the driven shaft 16 and the driving shaft 10 reach the same speed, the gears 12 and 33 will stop rotating about their own axes and the entire assembly will rotate about the common axis of the driving and driven shafts in unison.

Considering this somewhat further, the centrifugal force caused by rotation of the carrier 18 and the planet gears 33 around the common axis of the driving and driven shafts tends to maintain the flowable weight at a maximum radial distance from the common axis. If there was a purely circumferential cavity in the housing 36, the flowable weight would remain at a constant maximum radial distance from said common axis and would rotate therearound and the housing members would similarly rotate about said common axis. However, by virtue of the cavity 48, as the housing rotates about the axis of the shaft 31, the flowable weight is forced to move inwardly against the centrifugal force and, in effect, to move through an irregular path about the axis of shaft 31. This sets up two more forces, namely, the centrifugal force due to movement of the flowable weight around the axis of shaft 31 and an accelerating or decelerating force due to the changing radial distance between the common axis of the driving and driven shafts and the center of mass of the flowable weight.

Referring in greater detail to the operation of the unit, FIGURE 3 illustrates the position of the liquid in the respective housing sections after the initial few rotations of the driving shaft. Since much of the operation of this unit is the same as that of the unit shown in my United States Patent No. 2,692,517, such operation will not be described in detail herein. However, the features which provide the improved operation will be described in detail hereinafter. The following will refer to the positions of the weight in the sections 42 but it will be understood that the same description applies with respect to the weight in the sections 43 although it will be understood that the positions of the weight in sections 43 are displaced 180 degrees with respect to the corresponding positions in the sections 42.

In position I, the liquid in section 42 is disposed in the passage 49, due to centrifugal force, and its center of force passes through the center of rotation of gear 33 so that the liquid neither opposes nor aids rotation. In position II, a generally similar condition exists, although the center of force may be offset slightly. By the time the section 42 reaches position III, the liquid has started to fill the cavity 48 and the center of force is offset from the center of rotation of gear 33 so that a moment restraining rotation of the gear is imposed thereon. In positions IV and V, a similar condition exists. During movement from position V to position VI, the liquid will move from the cavity 48 into the passage 49 and in the latter position the center of force will be positioned so as to assist rotation of the gear 33. While this latter force is undesirable it is of short duration. Hence, during the greater part of the rotation of the gear 33, there is applied a moment restraining rotation of the gear about its own axis.

Returning now to positions III, IV and V, it will be observed that the liquid moves in a circular fashion about the axis of the cavity 48 in a counterclockwise direction and moves radially inwardly toward the axis of rotation of the gear 33 and toward the common axis of the driving and driven shafts. As mentioned above, this establishes additional forces on the liquid. Because the wall 46 is arcuate, the liquid moves in a smooth, closely controlled fashion along the arcuate wall so that the coupling operates smoothly. When the liquid reaches the level of the peak of the cusp 54 (position V) and the section 42 begins to move outwardly, the liquid spills out of the cavity 48 into the passageway 49. In so doing, the liquid will fly radially outwardly but the action will be gradual and the distance traveled will be small so that the roughness in the operation caused by this action will be minimal. The arcuate extent of the cavity 48, particularly the height of the cusp 54 thereof, is made as large as possible in order to hold the liquid in the cavity as long as possible in order to obtain maximum duration of the time during which rotation of the gear 33 is retarded.

The step-up gear set comprising gears 12 and 26 insures that the carrier 18 and therefore the gears 33 rotate at a high speed, thereby insuring a much higher centrifugal force and greater torque whereby the response time of the coupling is greatly lessened.

*Modifications*

Referring to FIGURE 4, the modified housings 61 each have two endless passages 62 and 63 which are mirror images of each other. The passages 62 and 63 each consist of an inner arcuate section 64 and an outer arcuate section 66 which are concentric. The adjacent ends of the sections 64 and 66 are connected by reversely bent portions 67. A weight 68, which may be a mass of heavy liquid or a ball, is disposed in each of the passages for movement therealong. The operation in this embodiment will be sufficiently similar to the operation of the principal embodiment that detailed description thereof is believed unnecessary. However, it will be noted that the weight is at all times guided in the passageway so that a very smooth operation results. A coupling employing housings 61 of this type is capable of reversible operation.

Referring to FIGURE 5, there is shown a housing 71 which is substantially identical to the housing 36 except that said housing has two cavities 72 at the opposite ends of each section thereof, each of said cavities 72 being identical to the cavity 48. If a ball 73 is used as the weight, a pin 74 may be placed in each cavity to guide movement of the ball. A coupling employing this type of housing is reversible, but otherwise its operation is the same as the operation of the principal embodiment of the invention.

Referring to FIGURE 6, there is shown a modified housing 81 which contains two substantially identical cavities 82 and 83 therein. Each of the cavities 82 and 83 comprises a pair of substantially cylindrical cavity portions 84 and 85 interconnected by an intermediate passageway 86. The cylindrical cavity portion 84 is, as illustrated, of larger diameter than the cylindrical cavity portion 85. However, the cylindrical cavity portions 84 and 85 could be of the same diameter if desired. The cylindrical portions 84 of the cavities 82 and 83 are diametrically spaced opposite one another and similarly the cylindrical portions 85 of the cavities 82 and 83 are also diametrically spaced opposite one another, the cylindrical portions 84 being spaced radially outwardly from the cylindrical portions 85. A weight 87, which is preferably a mass of heavy liquid, is disposed in each of the cavities 82 and 83 for movement therein. The operation of this embodiment described above. A detailed description thereof is believed unnecessary. The embodiment illustrated in FIGURE 6 is advantageous because the shapes of the cavities 82 and 83 are such that the fluid does not spread out as much as it does in the embodiment illustrated in FIGURE 3.

While particular preferred embodiments of the invention have been described, the invention contemplates such changes and modifications therein as lie within the scope of the appended claims.

The embodiments of the invention in which an exclusive property or privilege is claimed are defined as follows:

1. A variable speed coupling for drivingly connecting the adjacent ends of a pair of coaxial shafts, comprising:
   a first rotatable member connectible to one of said shafts and having a plurality of circumferentially spaced first planetary gears rotatably mounted thereon;
   a ring gear surrounding and meshed with said first planetary gears;
   a carrier secured to said ring gear for rotation therewith;
   a plurality of circumferentially spaced second planetary gears rotatably mounted on said carrier;
   a second rotatable member coaxial with and rotatable with respect to said first member and connectible to the other of said shafts, said second member having two axially spaced sun gears, mounted thereon, one of said sun gears being disposed between and being in meshing engagement with said first planetary gears and the second of said sun gears being disposed between and being in meshed engagement with said second planetary gears;
   housing means conected to each of said second planetary gears, each housing means having a pair of symmetrically arranged closed chamber sections therein, each chamber section having wall means defining a cavity therein; and
   a weight freely movably disposed in each chamber section whereby centrifugal force acting upon said weight upon rotation of one of the shafts will effect rotation of the other shaft.

2. A variable speed coupling according to claim 1, wherein said wall means defining said cavity has a radially outer wall and an arcuate end wall at one peripheral end thereof defining a portion of said cavity, said end wall being curved about an axis offset from the axis of said planetary gear, and being parallel therewith, said arcuate end wall merging smoothly with and extending radially inwardly from the adjacent end of said radially outer wall.

3. A variable speed coupling according to claim 2, wherein said weight is a flowable mass, and said arcuate end wall extends through an arc in excess of 180 degrees, said housing means having a radially inner wall extending from the other end of said arcuate end wall whereby there is formed a passage between said radially inner and radially outer walls which is of less width than the diameter of the portion of the cavity formed by said arcuate end wall, the juncture of said end wall and said radially inner wall forming a cusp for retaining the flowable mass within said cavity during a portion of each rotation of said housing means.

4. A variable speed coupling according to claim 2, wherein said wall means defining said cavity has arcuate end walls at both peripheral ends of said radially outer wall defining two circumferentially spaced cavity portions, said arcuate end walls being curved about parallel spaced axes which are offset from and parallel with the axis of its associated planetary gear, the radially outer ends of said arcuate end walls merging smoothly with and extending radially inwardly from the adjacent ends of said radially outer wall, said arcuate end walls extending through an arc in excess of 180 degrees, and a radially inner wall extending between the radially inner ends of said arcuate end walls whereby there is formed a passage between said radially inner and radially outer walls, said passage extending between and being of less width than the diameter of said cavity portions.

5. A variable speed coupling according to claim 1, wherein said wall means defining said cavity has two radially spaced, arcuate, peripherally extending passages, said passages being connected at corresponding peripheral ends thereof by arcuate end passages which are curved about axes offset from and parallel with the axis of the associated planetary gear, the walls of said passages merging smoothly with each other to define an endless passageway.

6. A variable speed coupling according to claim 1, wherein said wall means defining said cavity has first and second arcuate end walls defining first and second arcuate cavity portions, said arcuate end walls being curved about parallel spaced axes which are offset from and parallel with the axis of its associated planetary gear, the axis of said first arcuate end wall being spaced radially outwardly and circumferentially from the axis of said second arcuate end wall, said arcuate end walls each extending through an arc in excess of 180 degrees, and intermediate walls interconnected between said first and second arcuate end walls for forming a passage between said first and second arcuate cavity portions with said passage being of lesser width than the diameters of said arcuate cavity portions.

7. A variable speed coupling for drivingly connecting the adjacent ends of a pair of coaxial shafts, comprising:
   a carrier drivingly connectible to one of said shafts for rotation about the axis thereof;
   a plurality of circumferentially spaced planetary gears rotatably mounted on said carrier;
   a rotatable member coaxial with and rotatable with respect to said carrier and connectible to the other of said shafts, said rotatable member having gear means mounted thereon and drivingly connectible with said planetary gears;
   housing means connected to each of said planetary gears, each housing means having a pair of circumferentially spaced chamber sections therein, said chamber sections being symmetrically arranged about the axis of rotation of the associated planetary gear and being coextensive with each other in a direction along said axis, each chamber section having wall means defining a cavity therein with said cavity having a substantially arcuate portion and an elongated passage in communication with said arcuate portion, said elongated passage as defined by said wall means extending substantially circumferentially relative to the rotational axis of the respective planetary gear; and a movable weight associated with each chamber section and guided by the walls thereof whereby centrifugal force acting upon said weights upon rotation of said one of said shafts will effect rotation of the other shafts.

8. A variable speed coupling according to claim 7, wherein said wall means defining said cavity has a radially outer wall concentric with the axis of its associated planetary gear and an arcuate end wall at one peripheral end thereof defining said arcuate cavity portion, said arcuate end wall being curved about an axis offset from and parallel with the axis of its associated planetary gear, one end of said arcuate end wall merging smoothly with and extending radially inwardly from the adjacent end of said radially outer wall.

9. A variable speed coupling according to claim 7, wherein said chamber section is closed and said weight is a flowable mass, and said wall means defining said cavity has a radially outer wall and an arcuate end wall at one peripherial end thereof defining said arcuate cavity portion, said arcuate end wall being curved about an axis offset from and parallel with the axis of ist associated planetary gear and extending through an arc in excess of 180 degrees, one end of said arcuate end wall merging smoothly with and extending radially inwardly from the adjacent end of said raidally outer wall, said housing having a radially inner wall extending from the other end of said arcuate end wall whereby said radially inner and outer walls define said elongated passage with said elongated passage being of less width than the diameter of said arcuate cavity portion, the junction of said end wall and said radially inner wall forming a cusp for retaining the flowable mass within said arcuate cavity portion during a portion of each rotation of said housing means.

10. A variable speed coupling according to claim 7, wherein said wall means defining said cavity has a radially outer wall and arcuate end walls at both peripheral ends of said outer wall defining two circumferentially spaced arcuate cavity portions, said arcuate end walls being curved about parallel spaced axes which are offset from and parallel with the axis of its associated planetary gear, the radially outer ends of said arcuate end walls merging smoothly with and extending radially inwardly from the adjacent ends of said radially outer wall, said arcuate end walls extending through an arc in excess of 180 degrees, and a radially inner wall extending between the radially inner ends of said arcuate end walls, said radially inner and radially outer walls defining said elongated passage, which passage extends between and is of lesser width than the diameters of said arcuate cavity portions.

11. A variable speed coupling according to claim 7, wherein said wall means defining said cavity has two radially spaced, arcuate, peripherally extending elongated passages, said passages being connected at corresponding peripheral ends thereof by arcuate end passages which are curved about axes offset from and parallel with the axis of the associated planetary gear, the walls of said passages merging smoothly with each other to define an endless passageway.

12. A variable speed coupling according to claim 7, wherein said wall means defining said cavity has radially inner and outer walls defining said elongated passage and arcuate end walls at both peripheral ends of said inner and outer radial walls, said arcuate end walls defining two circumferentially spaced arcuate cavity portions with said arcuate end walls being curved about parallel spaced axes which are offset from and parallel with the axis of its associated planetary gear, the axis of one of said arcuate end walls being offset radially outwardly relative to the axis of said other arcuate end wall, and said elongated passage defined by said inner and outer radial walls extending between and being of less width than the diameters of said arcuate cavity portions.

13. A variable speed coupling according to claim 7, wherein the cavity of each of said chamber sections as defined by said wall means is closed so as to prevent communication between the pair of circumferentially spaced chamber sections formed within each housing means, and wherein said weight is a flowable mass with said wall means preventing said flowable mass from flowing between the pair of cavities formed in each of said housing means.

References Cited

UNITED STATES PATENTS

| 1,691,611 | 11/1928 | Reece et al. | 74—752 |
| 2,046,346 | 7/1936 | Shaw | 74—752 |
| 2,113,479 | 4/1938 | Scott-Iversen | 74—752 |
| 2,692,517 | 10/1954 | O'Hara | 74—752 |

FOREIGN PATENTS

| 907,201 | 6/1945 | France. |
| 301,971 | 10/1932 | Italy. |
| 416,309 | 11/1946 | Italy. |

DONLEY J. STOCKING, Primary Examiner.

T. C. PERRY, Assistant Examiner.

U.S. Cl. X.R.

74—774